Figure 1:
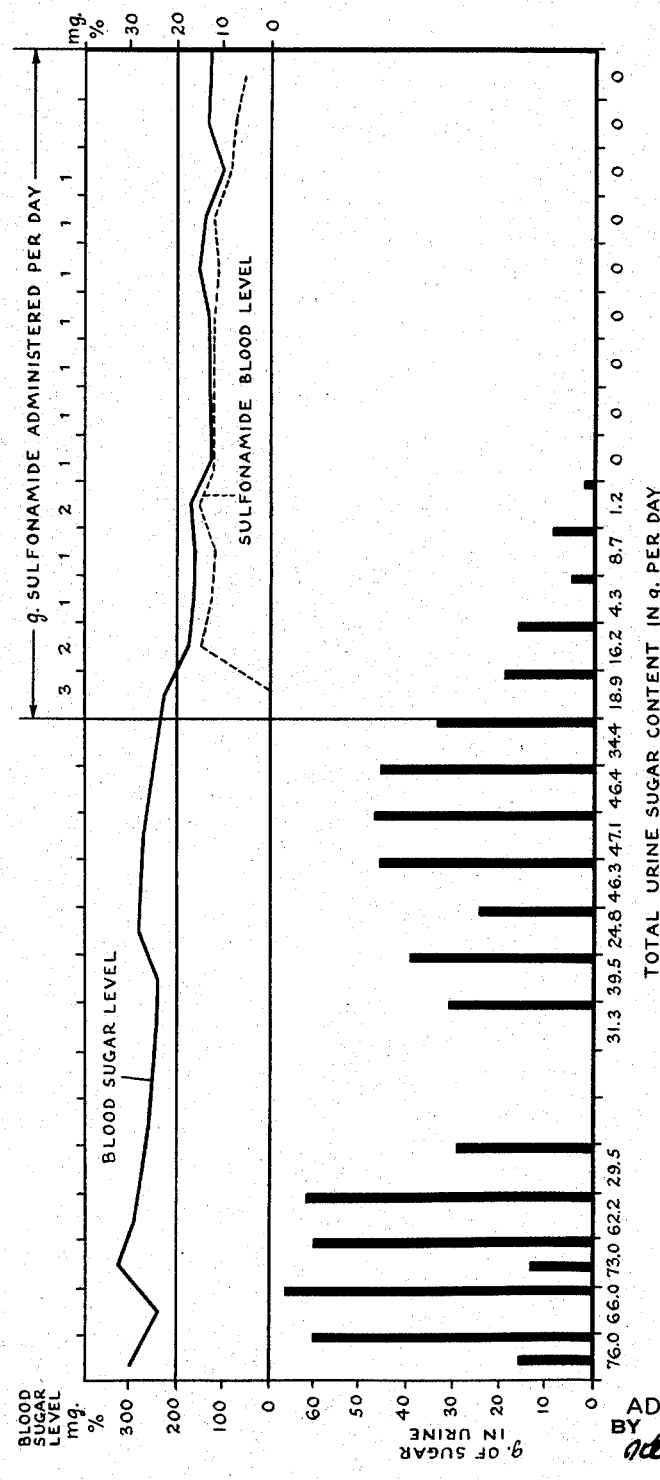

FIG.I.

United States Patent Office 2,907,692
Patented Oct. 6, 1959

2,907,692

COMPOSITION FOR TREATING DIABETES AND A PROCESS OF ADMINISTERING SAME

Erich Haack, Heidelberg, and Adolf Hagedorn, Mannheim-Waldhof, Germany, assignors to C. F. Boehringer & Soehne G.m.b.H., Mannheim-Waldhof, Germany, a corporation of Germany Application August 30, 1955, Serial No. 531,356

Claims priority, application Germany February 11, 1953

9 Claims. (Cl. 167—51.5)

The present invention relates to compositions useful in the treatment of diabetes and more particularly to orally effective compositions and to a method of treating diabetes therewith.

Heretofore, many attempts have been made to provide an antidiabetic preparation which can be administered by other routes than by injection, and especially by mouth. All these attempts, however, have failed either because of their unreliable activity or beacuse of the toxic side-effects encountered on their administration.

It is one object of the present invention to provide a new antidiabetic preparation which permits administration by other routes than the parenteral one and more particularly which permits oral administration, which, on such oral administration, does not produce toxic side-effects and does not affect the liver, suprarenal glands, and other organs, and which has a reliable and satisfactory antidiabetic activity so that it can safely be administered to diabetic patients.

Another object of the present invention is to provide a method of treating diabetes by subjecting the diabetic patient to oral administration of such in antidiabetic preparation in predetermined specific dosages taken at predetermined periods of time.

Other objects of the present invention and advantageous features of the present invention will become apparent as the description proceeds.

In principle, the antidiabetic preparation according to one phase of the present invention comprises as active antidiabetic ingredient n-butyl sulfanilyl urea of the following formula

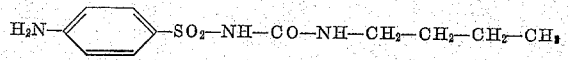

and its alkali metal, alkaline earth metal, ammonium and organic amine salts.

N-butyl sulfanilyl urea has a surprisingly high, reliable, and uniform blood sugar lowering activity and has substantially no toxic side-effects upon the human system and especially upon liver, suprarenal glands, and other organs.

The action of sulfonamides upon bacteria, according to a now generally accepted theory, is to prevent the synthesis of pteroyl compounds which are required by such bacteria as growth factors. For this purpose, it is necessary to administer the sulfonamide in dosages which will maintain a sulfonamide blood level sufficient to prevent such synthesis of pteroyl compounds by utilization of available p-amino benzoic acid in the body.

It is not only quite surprising and entirely unexpected that n-butyl sulfanilyl urea has a blood sugar lowering activity but also that, for obtaining satisfactory results, the dosage to be administered is lower than that of antibacterial sulfonamides now generally in use.

Pharmacological tests tend to advance the theory that the antidiabetic effect is due to an action of n-butyl sulfanilyl urea upon the A-cells of the islands of Langerhans. Apparently, said compound inhibits selectively the A-cells and, thus, the "glukagon" production of said cells. This action upon the A-cells of the islands of Langerhans is clearly demonstrated in experiments with rats and rabbits to which a single large dose of n-butyl sulfanilyl urea beyond the dosage of this invention was administered.

It might be assumed that the blood sugar lowering effect resulting after administration of n-butyl sulfanilyl urea is caused by a reduction in activity of the A-cells.

The acute toxicity of n-butyl sulfanilyl urea, i.e., its $DL_{50}$ is 3.0 g. per kg. mouse subcutaneously administered.

Tests to determine its chronic toxicity were also carried out. For this purpose three groups of rats, each of three animals, were given orally every day for a period of 64 days 0.1 g., 0.25 g., and 0.50 g. of n-butyl sulfanilyl urea per kg. body weight, respectively.

The toxic effect of said compound was judged by the following methods:

(a) Measurement of body weights twice weekly. No important weight loss was suffered by any of the animals.

(b) Taking every week a differential blood count. n-Butyl sulfanilyl urea has no quantitative effect on the number of red and white blood cells nor on the leucocyte differential counts.

Qualitatively, administration of said compound did not cause any variations and in particular, no formation of degenerative or stimulated forms of white blood corpuscles.

(c) Histological examination of internal organs at the end of the treatment with n-butyl sulfanilyl urea.

Brain, heart, liver, pancreas, spleen, kidneys, suprarenal glands, testes, epididymis, and thyroid glands showed, on histological examination, no variation. In particular, no evidence of an arrest of cell growth or cell division was found.

Pharmacological tests show that after administration of an initial therapeutic dose of about 4.0 g. of n-butyl sulfanilyl urea to humans, the blood concentration of said compound decreases only by about 20% within 24 hours. It follows that the excretion rate is slow. Therefore daily administration of 1 g. to 2.0 g., on consecutive days, results, on about the fourth day, in establishing an equilibrium between absorption and excretion and substantially maintaining the initially produced blood level.

It is however not necessary to give such a high initial dose. The patient can be started with the normal dose of 1 g. to 2.0 g. whereby the equilibrium between absorption and excretion is also attained within a few days.

The preferred clinical initial dose given orally is 2.0 g. to about 4.0 g. of n-butyl sulfanilyl urea as the first treatment. A satisfactory blood sugar level is subsequently maintained by administering a single dose between 1.0 g. and 2.0 g. per day, or if desired, subdivided in 4 separate doses of 0.25 g. to 0.5 g. per dose. The prescribing physician in some instances may find that a sufficient blood level is maintained on administration of 1.0 to 2.0 g. every other day for a substantial period of time. Ordinarily daily doses in excess of about 3.5 g. should not be given since the compound is relatively slowly excreted, and such larger doses may lead to undesirable side effects.

Clinical tests on more than 200 diabetic persons for an extended period have confirmed the antidiabetic effect of n-butyl sulfanilyl urea. A definite lowering of the blood sugar level is achieved in 80–90% of the cases by oral administration of small doses of said compound. Previously existing glycosuria disappears simultaneously. Use of n-butyl sulfanilyl urea as hereinbefore set forth dispenses with at least 40 units of depot insulin or permits giving additional carbohydrates without deterioration of the state of the metabolism. The results show that not only is the blood sugar level reduced but also the carbohydrate tolerance improved and a bigger turnover of carbohydrates is effected.

In a number of cases, reduction of the blood sugar levels and improvement of the metabolism continued for some time after the last administration of the drug.

In cases treated with said compound, no resistance to subsequent administration of insulin results.

Figure 2:
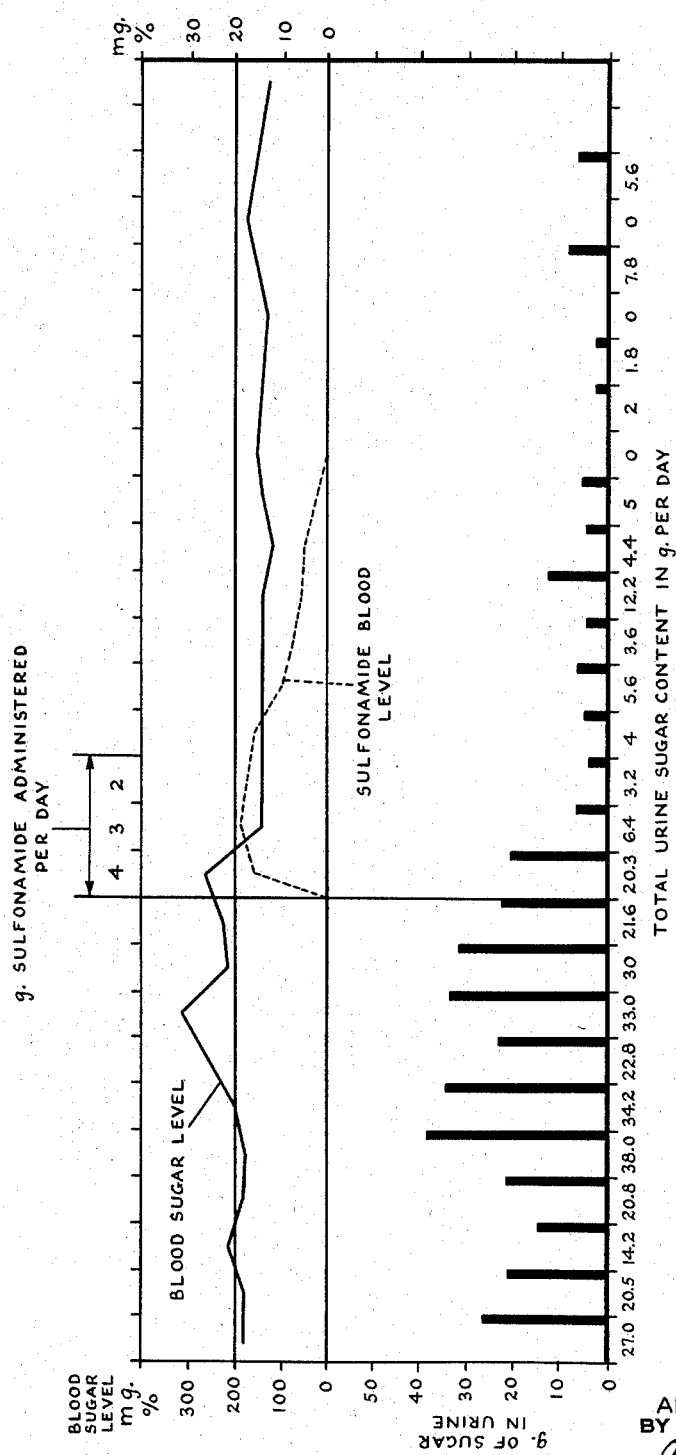

The attached Figures 1 to 7 illustrate the effect of administration of n-butyl sulfanilyl urea upon the sugar content in the blood and in the urine of diabetic persons. Figs. 1 and 2 show the action of n-butyl sulfanilyl urea upon persons who were not previously treated with insulin while Figs. 3 to 7 illustrate the effect of said n-butyl sulfanilyl urea upon diabetics who were previously treated with insulin.

In Figs. 1 and 2, the upper curve (full line) indicates the blood sugar level in mg. percent, while the lower curve (dotted line) represents the content of n-butyl sulfanilyl urea in the blood after administration of various amounts of said compound. In Fig. 1 the initial dose was 3.0 g. followed on the second and fifth day by 2 g. and on the third, fourth and sixth to twelfth day by one g. of said compound. It is evident from these curves that the blood sugar level which before administration of n-butyl sulfanilyl urea exceeds 200 mg. percent is reduced shortly after starting the treatment to a blood sugar level substantially below 200 mg. and 6 days after the first administration of said compound to a blood sugar level not exceeding 150 mg. percent.

The sulfonamide blood level clearly shows that it is possible to maintain an effective blood level between 10 mg. percent and 15 mg. percent by daily administration of about 1.0 g. of n-butyl sulfanilyl urea.

Fig. 1 also shows that the sugar content of the urine of the patient is considerably reduced immediately after starting the treatment and that on the sixth day of the treatment no sugar can be detected in the urine.

It is also evident from said Fig. 1 that n-butyl sulfanilyl urea is slowly excreted and, therefore, exerts its blood and urine sugar lowering effect for several days after administration of n-butyl sulfanilyl urea has been discontinued.

Fig. 2 illustrates the effect of oral administration of n-butyl sulfanilyl urea for three days only. It is evident that the blood sugar lowering effect and also the urine sugar lowering effect persists for at least ten days after administration of n-butyl sulfanilyl urea has been discontinued.

Figure 3:
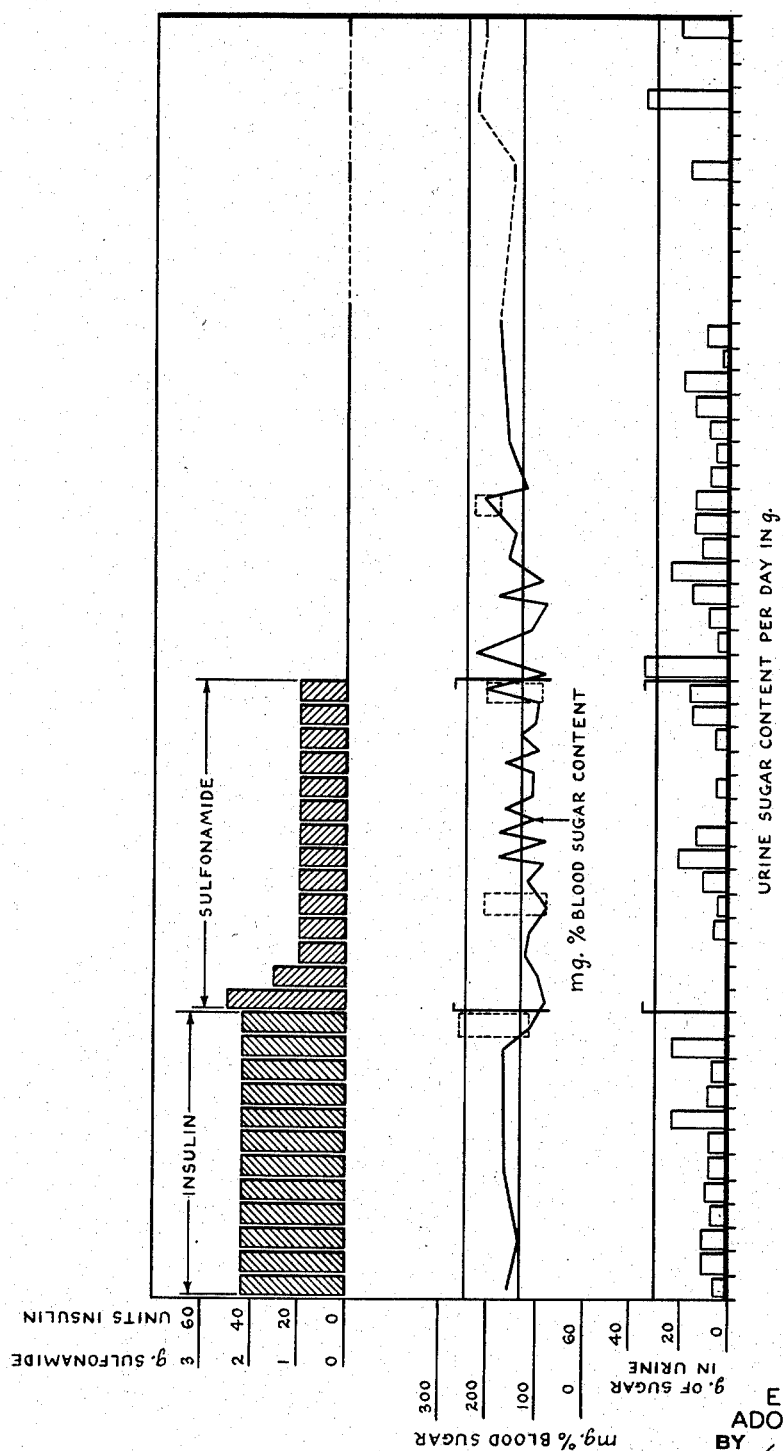

Fig. 3 illustrates that it is possible to substitute 44 units of depot insulin administered daily to a diabetic patient by administration of n-butyl sulfanilyl urea. Said n-butyl sulfanilyl urea is administered on the first day in an amount of 2.5 g., on the second day in an amount of 1.5 g., and on subsequent days in amounts of 1 g. The blood sugar curve and the sugar content of the urine is considerably reduced by administration of n-butyl sulfanilyl urea and the blood and urine sugar reduction continues for at least 14 days after administration of n-butyl sulfanilyl urea has been discontinued.

Figure 4:
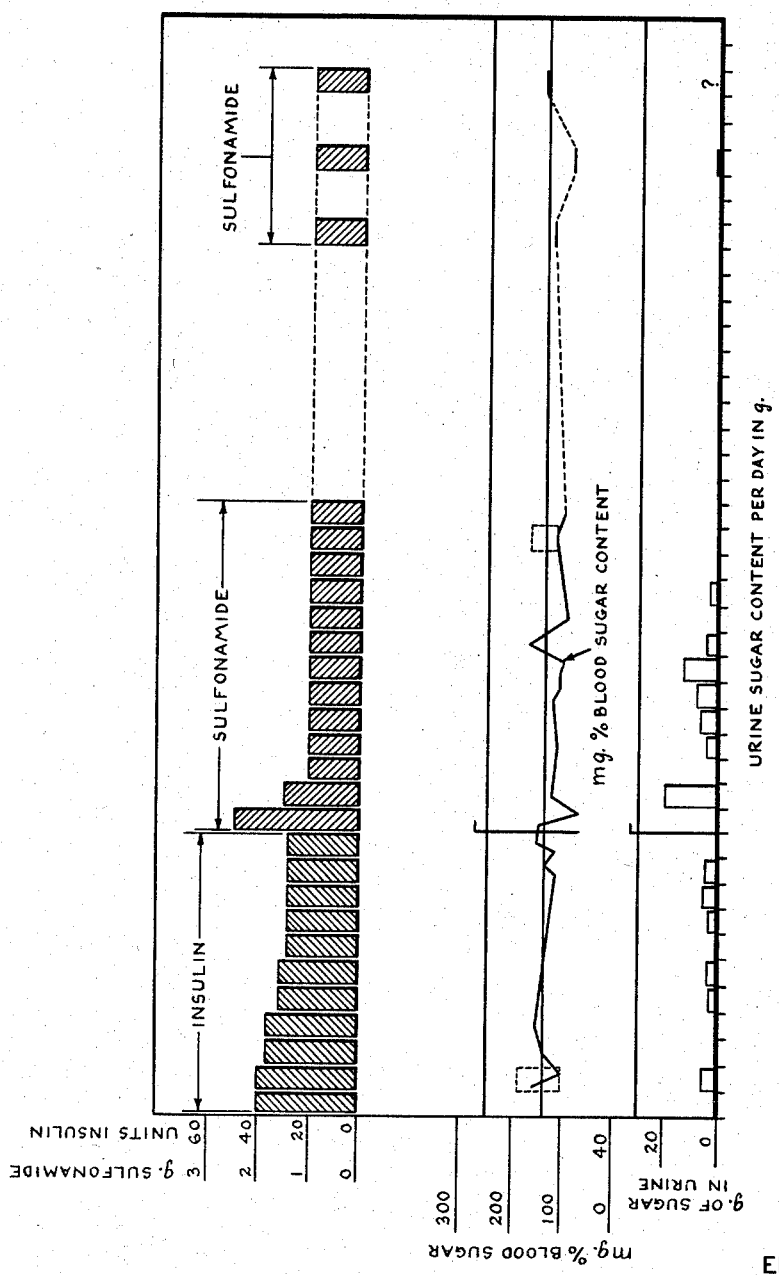

Fig. 4 shows that n-butyl sulfanilyl urea is capable of replacing 28 units of depot insulin whereby, on the first day, 2.5 g. of n-butyl sulfanilyl urea, on the second day 1.5 g., and on the following days 1 g. of said compound were given. Administration of 1 g. is sufficient to reduce the blood sugar to normal values between 100 mg. percent and 140 mg. percent, while the urine sugar is also considerably reduced and, after a few days of treatment, completely disappears.

Figure 5:
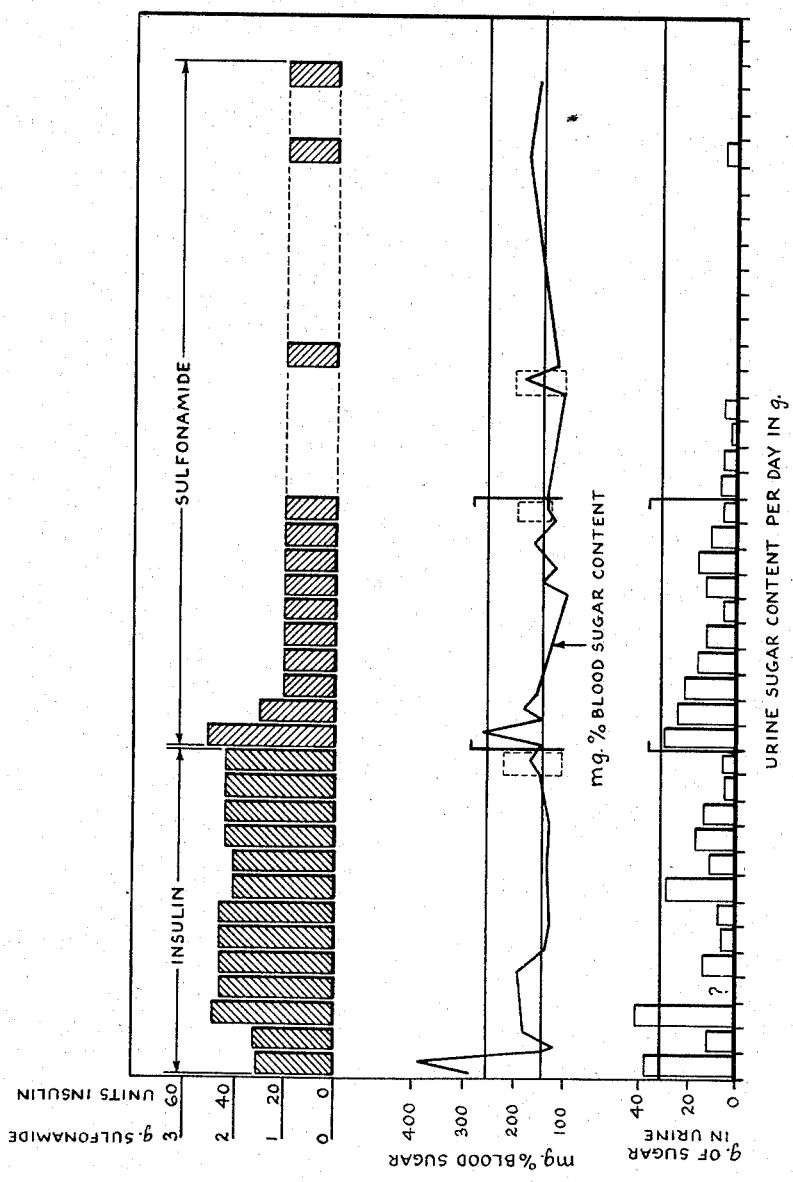

Fig. 5 also shows that 44 units of depot insulin can readily be replaced by administration of 1 g. of n-butyl sulfanilyl urea per day. The blood and urine sugar content is approximately the same as that obtained by administration of depot insulin.

Figure 6:
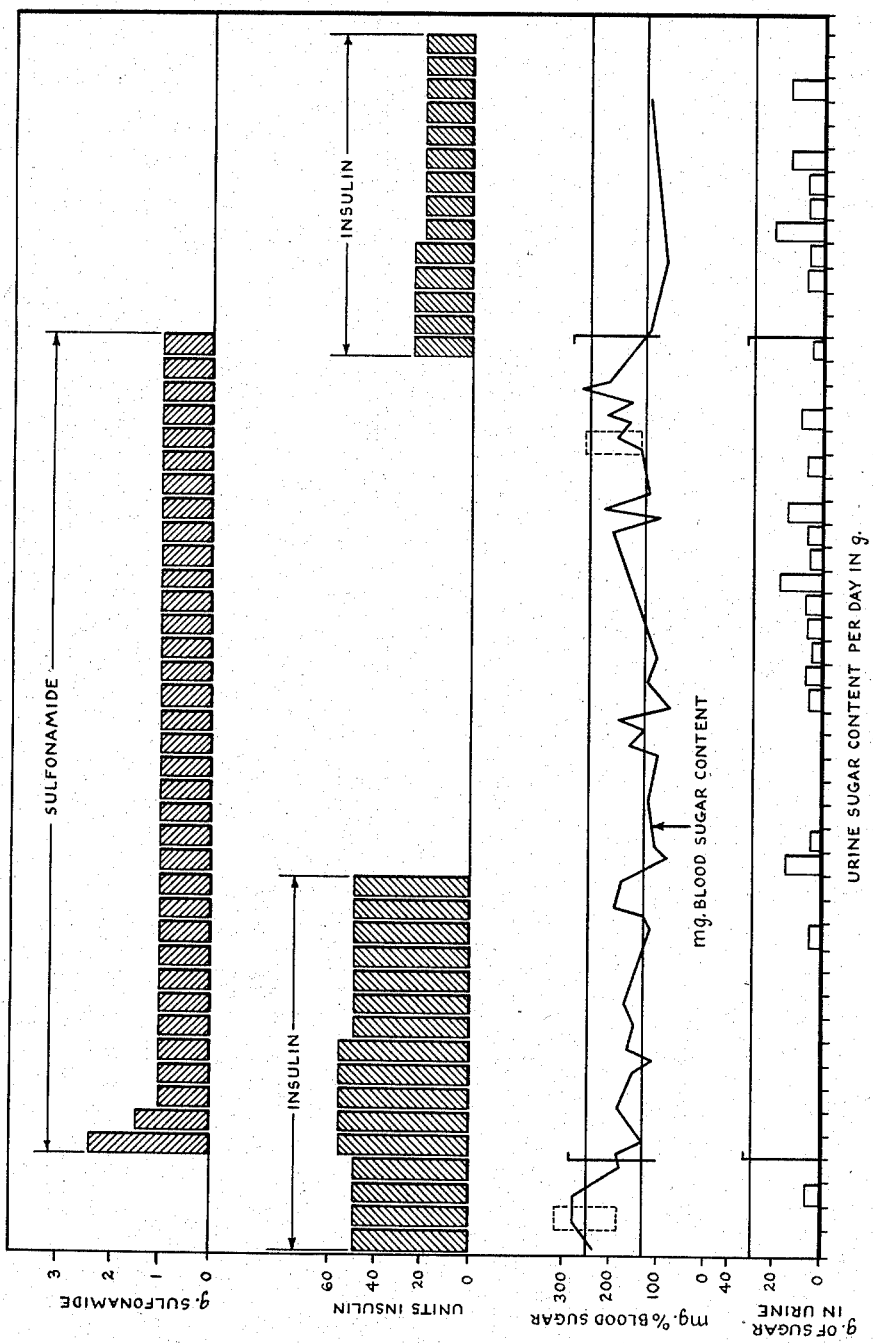
Figure 7:
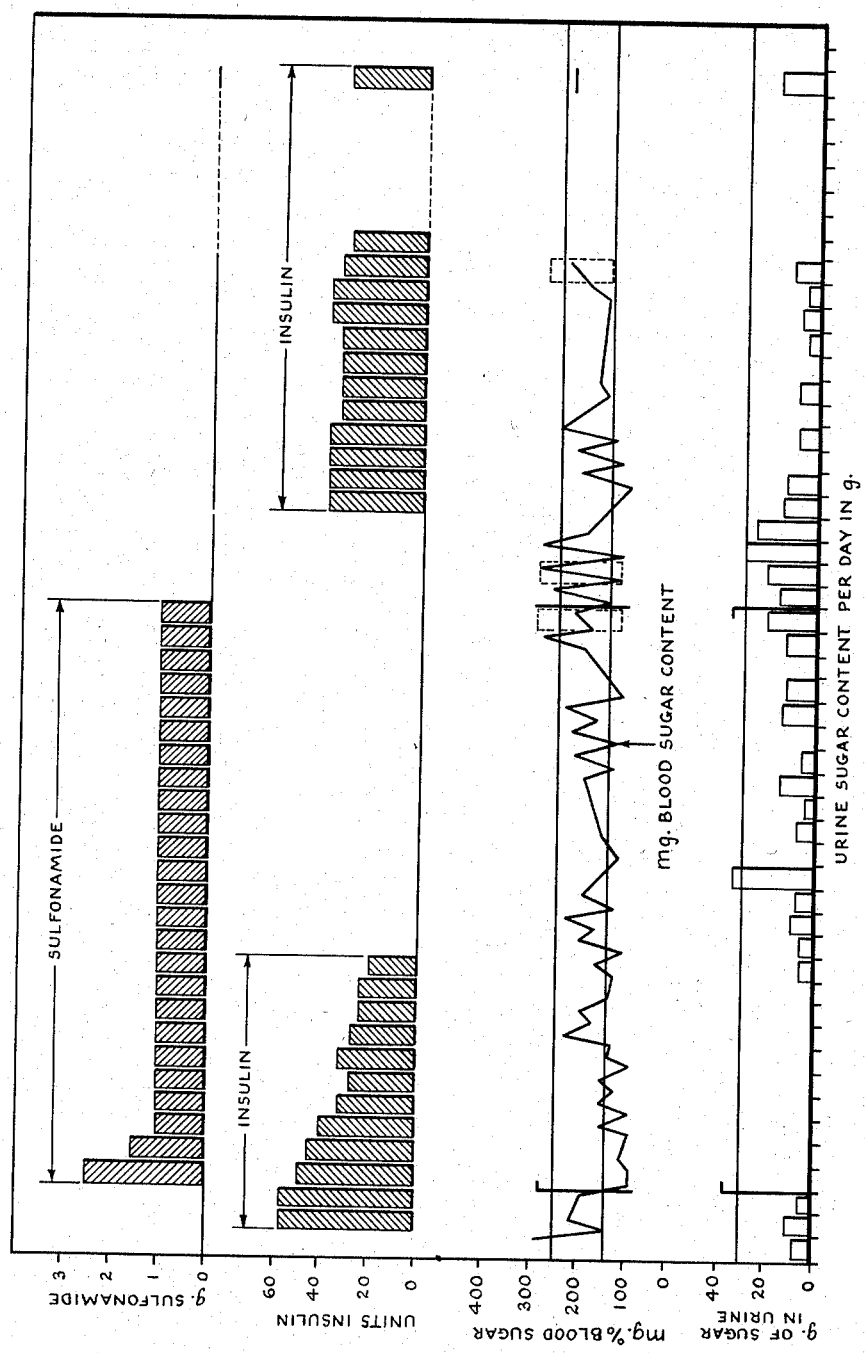

Figs. 6 and 7 show that no resistance to subsequent administration of insulin results in cases treated with n-butyl sulfanilyl urea. These figures clearly illustrate that n-butyl sulfanilyl urea is capable of replacing daily administration of 48 units of depot insulin or, respectively, of 56 units of depot insulin whereby a daily dose of 1.0 g. yields fully satisfactory results.

It is of interest to note that even in patients suffering, in addition to diabetes, from liver ailments, administration of n-butyl sulfanilyl urea has no adverse effect upon such liver damage, provided glucose is given simultaneously.

No appreciable side-effects, especially no apparent effect upon the thyroid gland, were observed in patients treated with n-butyl sulfanilyl urea. Particularly tests of liver function showed no deviation from the normal. One diabetic female patient with a slight hepatitis was treated with n-butyl sulfanilyl urea. There was no further deterioration in the slightly pathological liver function values which were present at the beginning of the treatment.

Oral administration of a single dose of n-butyl sulfanilyl urea to normal persons proved the blood sugar lowering effect of this compound and caused the fasting blood sugar level to decrease to hypoglycemic levels. Thereby the subjective and objective symptoms of a mild hypoglycemia appeared regularly. These symptoms disappeared after administration of carbohydrates.

All the available data prove quite convincingly that n-butyl sulfanilyl urea is a very valuable orally effective blood sugar lowering agent which, in a dose between 0.5 g. and 3.5 g., is capable of replacing injection of at least 40 units of insulin in about 80% to 90% of the cases and/or which permits to give additional carbohydrates without deterioration of the state of the metabolism. Taking into account the very large number of diabetics requiring continuous daily injections of insulin, the remarkable advantages achieved by the present invention become quite evident. The new antidiabetic preparations containing n-butyl sulfanilyl urea as blood sugar lowering ingredient offer for many diabetics a relief from the drudgery of daily injections. To supply the medical profession with such a substantially non-toxic, highly effective, orally administrable, well compatible, blood sugar lowering preparation, consequently, represents a considerable advance in the art.

n-Butyl sulfanilyl urea can be produced by reacting an acylated sulfanilic acid chloride with n-butyl urea. However, said simplest method has the disadvantage that the yield of the new n-butyl sulfanilyl urea is quite low and that a considerable number of by-products is formed. The reason for said low yield is that the sulfonyl group not only combines with the nitrogen atom but that it preferably combines with the oxygen atom yielding an isourea compound. The resulting isourea compound readily splits off the sulfonic acid and forms the corresponding substituted cyanamide.

Better results are obtained by using an acylated sulfanilamide as starting material and subjecting said amide to the action of compounds which are capable of forming substituted urea compounds with compounds containing an amino group. A preferred method of producing n-butyl sulfanilyl urea comprises the use of an alkali salt of sulfanilamide in place of the free sulfanilamide, For instance, by reversing the above mentioned reaction of sulfanilic acid chloride with n-butyl urea, an n-butyl substituted carbonic acid chloride is reacted with an alkali metal salt of a sulfanilamide according to the following equation:

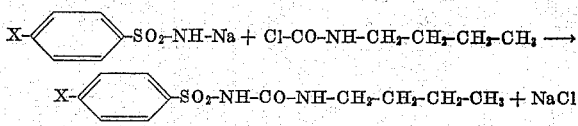

In said formulas X indicates an amino group or an acyl amino group, preferably an acyl amino group with a lower aliphatic acid such as the formyl amino, the acetyl amino, the propionyl amino group or the carbo (lower) alkoxy amino group.

Furthermore, n-butyl sulfanilyl urea can be obtained, for instance, by reacting an acyl sulfanilamide with the butyl ester of isocyanic acid according to the following equation:

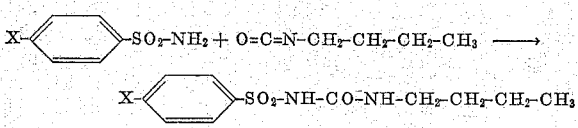

The acylated sulfanilamide is also preferably used in the form of its sodium or potassium salt.

On the other hand, it is possible to first produce an acylamino phenyl sulfonyl isocyanate from a suitable derivative of an acyl sulfanilamide and to then cause said isocyanate compound to react with n-butyl amine according to the following equation:

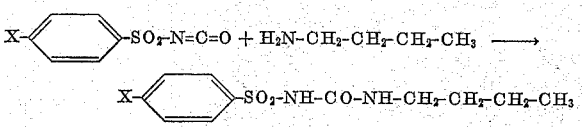

The sulfonyl isocyanate can be obtained, for instance, by thermal decomposition of a suitable sulfonyl derivative of carbamic acid according to the following equation:

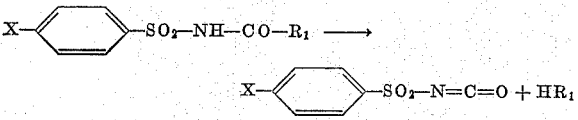

In said formulas $R_1$ indicates, for instance, a substituted or non-substituted alkoxy, phenoxy, alkylamino, phenylamino, dialkylamino, diphenylamino, or sulfonylamino group.

The resulting sulfonyl isocyanate compounds are highly reactive. Therefore, thermic decomposition is preferably carried out in the presence of n-butylamine. Said amine is immediately and directly condensed with the sulfonyl isocyanate in statu nascendi, i.e., as soon as formed. It is advisable to employ as the group $R_1$ a group which forms a compound $H$—$R_1$ that can readily be separated from the resulting n-butyl sulfanilyl urea and does not compete, in its reactivity, with the n-butylamine to be introduced into the molecule.

The preferred sulfonyl derivative of carbamic acid used in this process is the n-butylamine salt of bis-(acetyl sulfanilyl) urea. Optimum yields of n-butyl sulfanilyl urea are obtained by heating said salt to a temperature between about 140° C. and about 145° C. whereby substantially quantitative yields are obtained within about 1 hour.

Another method of producing the new n-butyl sulfanilyl urea comprises reacting, for instance, an n-butyl substituted isourea alkyl ether with an acylated sulfanilic acid chloride and splitting up the resulting acyl sulfanilyl isourea compound to an alkyl halogenide and the desired sulfanilyl urea according to the following equation:

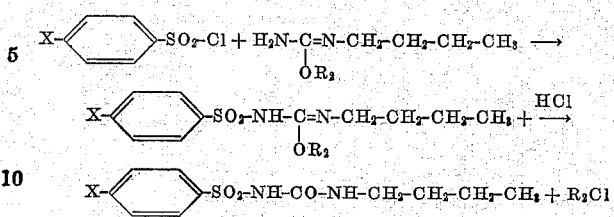

Cleavage of the isourea compound is effected by a treatment with hydrogen halide, whereby the corresponding alkyl halogenide and the desired sulfanilyl urea compound are formed.

Other derivatives of carbamic acid can also be used as starting materials and an undesired group present therein can be substituted by oxygen or can be converted into oxygen by other measures, for instance, by oxidation. Thus, for instance, a guanidine derivative can be converted by alkaline hydrolysis into the corresponding urea compound, or a thiourea compound can be oxidized, for instance, with nitrous acid to the desired sulfanilyl urea compound. The following equations illustrate such methods of producing the new and valuable n-butyl sulfanilyl urea compound according to the present invention:

Conversion of the guanidine derivative:

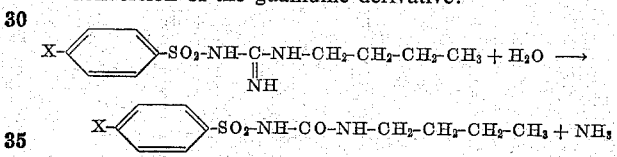

Conversion of the thiourea compound: (The reaction most probably proceeds as indicated)

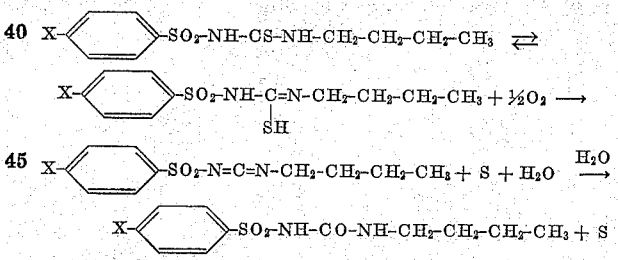

If desired, the acyl amino group X in the resulting acylated n-butyl sulfanilyl urea compound is hydrolyzed to the amino group, for instance, by a treatment with hydrolyzing agents which do not affect the sulfonyl urea group, such as aqueous sodium or potassium hydroxide solutions.

The following examples serve to illustrate preferred methods of producing said compound without, however, limiting the same thereto.

EXAMPLE 1

*n-Butyl sulfanilyl urea prepared from the n-butylamine salt of bis-(acetyl sulfanilyl) urea*

(a) 227 g. (0.5 mol) of bis-(acetyl sulfanilyl) urea are mixed with 800 cc. of water of a temperature of 80° C. 36.6 g. (0.5 mol) of n-butylamine are added thereto while stirring. After addition of the amine, the reaction mixture becomes completely clear. Stirring is continued whereby the butylamine salt of bis-(acetyl sulfanilyl) urea crystallizes while the solution is still hot. The mixture is stirred for three more hours whereby it is cooled to room temperature. The crystals are filtered off by suction and are washed with about 75 cc. of water. The salt is dried at 100° C. The yield is 231 g. (0.44 mol) corresponding to 88% of the theoretical yield.

By acidifying the mother liquor of the amine salt, further 22.1 g. of bis-(acetyl sulfanilyl) urea, corresponding to 9.8% of the theoretical yield, are recovered.

(b) 231 g. of said n-butylamine salt (0.44 mol) are heated in a drying oven to a temperature of 142–145° C. for one hour. The cooled, hard reaction product is heated with 200 cc. of water and is finely pulverized. The mixture is diluted with 400 cc. of water and 55 cc. of 10 N sodium hydroxide solution and is stirred for half an hour. Undissolved acetyl sulfanilamide is filtered off by suction. Carbon dioxide is introduced into the alkaline filtrate until phenolphthalein indicator is decolorized. Thereby, the remaining acetyl sulfanilamide formed on thermal decomposition is precipitated. It is filtered off by suction. The mother liquor is heated to about 50° C. and is then adjusted by the addition of 6 N hydrochloric acid to weakly Congo-acid reaction. n-Butyl acetyl sulfanilyl urea precipitates as a white crystalline mass. The yield amounts to 131 g. (0.42 mol) and corresponds to 95% of the theoretical yield. The melting point of said n-butyl acetyl sulfanilyl urea is 186–189° C.

(c) 113 g. (0.36 mol) of n-butyl acetyl sulfanilyl urea are heated with 220 cc. of 5 N potassium hydroxide solution to a temperature of 89° C. A crystal paste is formed thereby. On further heating said paste in a water bath of 920 C., while stirring, a clear solution is obtained. After stirring for about 2 hours at 92° C., n-butyl sulfanilyl urea precipitates in the form of the difficultly soluble potassium salt. The mixture is heated with 300 cc. of water to about 80° C. whereby a yellowish solution is obtained which is treated with activated charcoal. The clear filtrate is rendered weakly Congo-acid by the addition of 6 N hydrochloric acid at a temperature of 55° C. while stirring. Thereby n-butyl sulfanilyl urea precipitates in crystalline form. The crystals are filtered off by suction and washed with water. The yield amounts to 92.5 g. corresponding to 95% of the theoretical yield. The melting point of said n-butyl sulfanilyl urea is 140–142° C.

EXAMPLE 2

*n-Butyl sulfanilyl urea prepared from n-butyl isothiocyanate and the sodium salt of acetyl sulfanilamide*

(a) 233 g. of the sodium salt of acetyl sulfanilamide are stirred with 233 cc. of triethylene glycol. 118 g. of n-butyl isothiocyanate are added to the resulting homogeneous mixture. The resulting sirup is heated to a temperature of 85° C. for 4 hours. The mixture is then stirred with 1000 cc. of chloroform and 1000 cc. of water. The chloroform layer is twice shaken with water, each time with 250 cc. The aqueous extracts are combined and rendered weakly alkaline to phenolphthalein by the addition of hydrochloric acid. Unreacted acetyl sulfanilamide precipitates and is filtered off by suction. The filtrate is acidified to a pH of 6.5 by the addition of hydrochloric acid. An oily precipitate settles from the reaction solution and is separated therefrom. n-Butyl acetly sulfanilyl thiourea is precipitated from the mother liquors obtained thereby by the addition of hydrochloric acid until Congo paper changes its color to blue. The yield amounts to 210 g.

(b) 210 g. of n-butyl acetyl sulfanilyl thiourea are dissolved in 1400 cc. of acetone while heating. The solution is mixed with 500 cc. of water. A solution of 63 g. of sodium nitrite in 120 cc. of water is added thereto within about 45 minutes while stirring and cooling to 15–20° C. A suspension of crystals is obtained. 240 cc. of 25% glacial acetic acid are added thereto within 30 minutes. Stirring of the mixture is continued for 6 hours. n-Butyl acetyl sulfanilyl urea mixed with sulfur is precipitated and filtered off by suction. The crude reaction product is suspended in 1000 cc. of water and is rendered weakly alkaline to phenolphthalein. Undissolved sulfur is filtered off by suction. The filtrate is acidified by the addition of hydrochloric acid. 250 g. of n-butyl acetyl sulfanilyl urea having a melting point of 186–189° C. are obtained.

(c) 250 g. of said n-butyl acetyl sulfanilyl urea are heated with 500 cc. of 5 N potassium hydroxide solution to a temperature of 92° C. for 2 hours while stirring. The solid reaction product is dissolved by heating with 750 cc. of water and is purified by means of activated charcoal. The resulting solution is heated to 60° C. and is acidified by the addition of hydrochloric acid. 187 g. of n-butyl sulfanilyl urea melting at 139–141° C. are obtained thereby.

EXAMPLE 3

*n-Butyl sulfanilyl urea prepared from the sodium salt of p-nitro benzene sulfonamide and n-butyl isocyanic acid ester*

135 parts of the dry finely pulverized sodium salt of p-nitro benzene sulfonamide are suspended in 300 parts by volume of nitro benzene. 30.6 parts of n-butyl isocyanic acid ester are added to said suspension while stirring. The reaction mixture is kept at a temperature of 50–60° C. for 15 hours. Water is added thereto, and the mixture is adjusted by the addition of acetic acid to phenolphthalein-neutral but litmus-alkaline reaction and is filtered. The aqueous solution is separated, extracted with ether, and acidified. The precipitated condensation product is washed with water and recrystallized from ethanol. Reduction with hydrogen in the presence of a nickel catalyst yields n-butyl sulfanilyl urea of the melting point 140–142° C.

EXAMPLE 4

*n-Butyl sulfanilyl urea prepared from acetyl sulfanilyl methyl urethane*

(a) 540 g. of acetyl sulfanilyl methyl urethane are added at once to a mixture of 180 g. of n-butylamine (about 10% excess) and 1800 cc. of water, said mixture being heated to 65° C. The urethane is rapidly dissolved and soon precipitation of the butylamine salt of the acetyl sulfanilyl methyl urethane sets in. Precipitation is completed by cooling and allowing the mixture to stand for some time. Almost quantitative yields are obtained when using the mother liquor in a subsequent charge.

(b) 70.2 g. of the resulting completely dried n-butylamine salt of acetyl sulfanilyl methyl urethane are heated in a very thin layer in a vacuum drying oven, the temperature of which can exactly be adjusted, first to 100° C. for half an hour and then to 140–145° C. for one hour in a vacuum. Thereby methanol is split off and is removed by distillation.

(c) The sintered and resolidified reaction mixture is heated with 140 cc. of water and 24 g. of sodium hydroxide to 60° C. for 3 hours. After cooling, the mixture is diluted with 150 cc. of water, activated charcoal is added thereto, and the filtrate therefrom is adjusted to a pH of 3.0 to 4.0 by the addition of concentrated hydrochloric acid. Thereby n-butyl sulfanilyl urea crystallizes. It is filtered off and dried, yielding 40–41 g. of the melting point of 140–142° C.

EXAMPLE 5

*n-Butyl sulfanilyl urea prepared from n-butyl isourea methyl ether hydrochloride*

(a) n-Butyl isourea methyl ether hydrochloride is prepared by reacting hydrochloric acid in methanol with N-n-butyl cyanamide. The same compound can be obtained by reacting dimethyl sulfate with n-butyl urea at a temperature of about 70° C. Thereby the corresponding methosulfate is obtained.

(b) 2 mols of said n-butyl isourea methyl ether hydrochloride are dissolved in dry dimethyl formamide. 2 mols of dry sodium methylate are added thereto at a temperature of −5° C. whereby the free base of n-butyl isourea methyl ether is formed.

(c) 1 mol of dry and recrystallized acetyl amino sulfanilic acid chloride is gradually added to said solution of n-butyl isourea methyl ether in the form of the free base at a temperature between 0° C. and −5° C. Thereby acetyl sulfanilyl n-butyl isourea methyl ether of the formulas

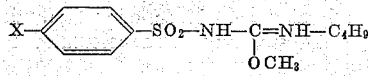

or, respectively,

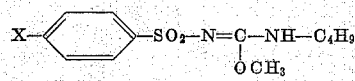

is obtained together with 1 mol of n-butyl isourea methyl ether hydrochloride. The last mentioned compound, of course, can be reacted by further addition of sodium methylate and a further mol of acetyl sulfanilyl chloride. The reaction mixture is poured into water. The water insoluble sulfanilyl compound is isolated therefrom by filtering off by suction and washing with water.

(d) The resulting acetyl sulfanilyl n-butyl isourea methyl ether is mixed in the moist state with twice its weight of concentrated hydrochloric acid and is heated gently. Methyl chloride is split off and escapes in the gaseous state. It is necessary that said cleavage reaction is carefully carried out whereby the heating temperature must not be higher than required for rapidly splitting off methyl chloride. Usually a temperature of about 40–50° C. is sufficient. As soon as the reaction is completed, the hydrochloric acid is neutralized with solid sodium bicarbonate and the neutralized mixture is diluted with water. n-Butyl acetyl sulfanilyl urea is obtained in good yield. Its melting point, on recrystallization from ethanol, is 186–187°.

(e) Saponification of said compound is carried out in the same manner as described hereinabove in Example 1(c).

As stated hereinabove, n-butyl sulfanilyl urea has proved to be an orally effective agent in the treatment of diabetes. While the preferred daily dose is about 1.0 g. to about 2.0 g. and the initial dose at the beginning of the treatment is about 2.0 g. to about 4.0 g., said compound has also been effective in a dose of 0.5 g. per day in the treatment of at least some patients. Such a minimum dose of 0.5 g. per day, however, is required to produce the desired blood sugar level.

With a daily dose between 0.5 g. and about 3.5 g. and with a preferred daily dose between 1.0 g. and 2.0 g. no toxic effects were observed.

Preferably, n-butyl sulfanilyl urea is administered perorally in a pharmaceutical carrier in standard form as tablets, pills, lozenges, dragees and the like shaped and/or compressed preparations. It is also possible to produce emulsions or suspensions of said compound in water or aqueous media such as unsweetened fruit juices and by means of suitable emulsifying or dispersing agents. The new antidiabetic agent may furthermore be employed in the form of powders filled into gelatin capsules or the like.

Such powders and mixtures to be used in the preparation of tablets and other shaped and/or compressed preparations may be diluted by mixing and milling with a solid pulverulent extending agent to the desired degree of fineness or by impregnating the already milled, finely powdered, solid carrier with a suspension of n-butyl sulfanilyl urea in water or with a solution thereof in an organic solvent, such as ethanol, methanol, acetone, and others and then removing the water or solvent.

When preparing tablets, pills, dragees, and the like shaped and/or compressed preparations, the commonly used diluting, binding, and disintegrating agents, lubricants, and other tableting adjuvants are employed, provided they are compatible with n-butyl sulfanilyl urea. Such diluting agents and other excipients are, for instance, sugar, lactose, levulose, starch, bolus alba, as disintegrating and binding agents gelatin, gum arabic, yeast extract, agar, tragacanth, methyl cellulose, pectin, and as lubricants stearic acid, talc, magnesium stearate, and others.

It is, of course, also possible to administer n-butyl sulfanilyl urea in the form of suppositories whereby the commonly used suppository vehicles, such as cocoa butter are used.

The amounts of n-butyl sulfanilyl urea in antidiabetic pharmaceutical units or dosage according to the present invention may be varied. It is also possible to administer several unit dosage forms at the same time. Since a daily dose of 0.5 g. is the minimum dose to be administered, it is advisable that not less than about 1% and preferably not less than about 5% of n-butyl sulfanilyl urea be present in compositions according to the present invention. It is, however, advantageous to prepare tablets and the like shaped and/or compressed preparations with a minor proportion of diluent and tableting adjuvants and a major proportion of n-butyl sulfanilyl urea. Tablets containing from 100 mg. to 500 mg. of said compound are particularly useful in administering the required dose.

The following examples of compositions containing n-butyl sulfanilyl urea as they are to be used in diabetes therapy serve to illustrate the present invention without, however, limiting the same thereto.

EXAMPLE 6

10.0 kg. of n-butyl sulfanilyl urea are moistened with 3500 cc. of a 1% gelatin solution and are kneaded in a kneader until its initial crystal structure has disappeared. The resulting mixture is granulated and is dried in an air current at about 40° C. to 10,350 kg. of granulate are obtained thereby. This granulate is intimately mixed, in a mixing apparatus, with 1550 g. of corn starch and 100 g. of magnesium stearate and compressed by means of a revolving tableting press to tablets having a diameter of 13 mm. and a weight of 0.6 g. Each tablet contains about 0.5 g. of n-butyl sulfanilyl urea.

EXAMPLE 7

10 kg. of n-butyl sulfanilyl urea are intimately kneaded with 2700 cc. of distilled water and 180 g. of anhydrous chemically pure sodium carbonate in a kneader for one hour. Thereby the sodium salt of n-butyl sulfanilyl urea is formed in an amount of about 10% of the n-butyl sulfanilyl urea used. The mixture is granulated and is dried in an air current at 40° C. The granulate, which amounts to 10.1 kg., is intimately mixed with 1100 g. of a special magnesium aluminium silicate and 100 g. of magnesium stearate. The mixture is compressed into tablets, each weighing 0.452 g. Each tablet contains 0.4 g. of n-butyl sulfanilyl urea.

EXAMPLE 8

Cores of dragees with convex surfaces composed of 0.25 g. of n-butyl sulfanilyl urea and of 0.0325 g. of potato starch containing 10% of stearic acid are prepared by compressing such a mixture. Said cores are coated in a dragee-coating vessel by means of sugar sirup and talcum. The last dragee coating contains aromatic, sweetening, and coloring agents and is polished and, if desired, provided with a thin metal foil layer.

EXAMPLE 9

The potassium salt of n-butyl sulfanilyl urea, obtained as described hereinafter, is intimately kneaded in finely pulverized state with an aqueous 2% methyl cellulose solution in an amount sufficient to produce a viscous paste and then kneaded. The kneaded mixture is granulated and dried. 8% of starch, calculated for the weight of the potassium salt, and 0.2% of a lubricant are admixed thereto. Semi-circular cores of dragees which contain 0.3 g. of n-butyl sulfanilyl urea (calculated as the free compound) are pressed therefrom. Said cores are worked up to substantially round dragees.

EXAMPLE 10

0.25 g. of pulverized pure n-butyl sulfanilyl urea are filled into one half of a gelatin capsule and the other half of said capsule is fitted thereover. Both halves are then united and sealed to form a gelatin capsule.

EXAMPLE 11

In place of n-butyl sulfanilyl urea used in Example 10 there are filled into the capsule 0.231 g. of the dry potassium salt. The closed and sealed capsule contains 0.2 g. calculated for free n-butyl sulfanilyl urea.

EXAMPLE 12

10 kg. of n-butyl sulfanilyl urea are finely pulverized and are mixed in a kneading device with a vegetable or suitable mineral oil in an amount sufficient to produce a suspension which is fluid and can be ejected through a cannula. Said suspension is injected, by means of a suitable machine, in a predetermined dosage between two plastic gelatin foils and the foils are seamlessly welded with each other. The resulting capsule is completely filled with n-butyl sulfanilyl urea, for instance, in an amount of 0.30 g. per capsule. The foils or the oil can be dyed, rendered opaque, or can otherwise be rendered distinctive.

In the same manner a suitable salt of said n-butyl sulfanilyl urea, for instance, the sodium, potassium, calcium, magnesium, ammonium salt, and others, are filled into such capsules whereby the amount of said materials is adjusted so that each capsule contains 0.25 g. calculated for free n-butyl sulfanilyl urea.

EXAMPLE 12a 10 kg. n-butyl sulfanilyl urea are mixed in a kneader with 2.5 kg. starch and 1.38 kg. lactose. This mixture is then further kneaded with a mucilage made from 4 litres water and 120 g. gum tragacanth. The resultant moist material is passed through an extrusion-press and then through a pill-making machine which gives moist pills weighing 0.18 g.

After removal of the moisture in a drier the pills weigh 0.14 g. and have an active material content of 0.1 g.

Instead of gum tragacanth one can employ other binding materials such as methyl cellulose, gum arabic or magnesium aluminium silicate (Veegum Vanderbilt, New York 17). It is also possible, by employing different rollers in the pill-making machine, to produce pills with a larger active material content.

EXAMPLE 13

A 10% suspension of finely pulverized n-butyl sulfanilyl urea in an aqueous 20% sugar solution is prepared. The sugar solution contains methyl cellulose in an amount sufficient to produce a viscous suspension. Aromatic substances such as oil of cinnamon, aniseed oil, vanillin, vanilla extract and, if desired, dyestuffs, are added thereto. The suspension is filled into bottles or tubes, 10 cc. thereof contain about 1 g. of n-butyl sulfanilyl urea.

In place of a 20% sugar solution there can be used a 50% levulose solution whereby the amount of n-butyl sulfanilyl urea in the resulting suspension can be increased to 15%. It is, of course, also possible to prepare suspensions of this type which contain only 5% of n-butyl sulfanilyl urea. The sugar may be completely omitted and/or in its place there may be used suitable fruit juices such as orange, grapefruit, tomato juice or the like. As a thickening agent may be used a suitable magnesium aluminium silicate instead of methyl cellulose.

EXAMPLE 14

A 7.87% solution of the magnesium salt in an aqueous 50% levulose solution is prepared. This solution may be aromatized in order to mask the taste of the active ingredient and can be rendered more viscous by the addition of methyl cellulose. 20 cc. of said solution contain 1.5 g. of n-butyl sulfanilyl urea calculated for its free form.

EXAMPLE 15

Finely pulverized n-butyl sulfanilyl urea is intimately mixed with a molten suppository vehicle of a fatty acid ester or polyethyleneglycol base. The mixture is poured into a suppository mold. The resulting suppositories contain about 1.0 g. of n-butyl sulfanilyl urea.

While n-butyl sulfanilyl urea is the preferred active ingredient of blood sugar lowering compositions according to the present invention, it has been found that the group of $N_3$-alkyl, alkylene, and cycloalkyl substituted sulfanilyl urea compounds having 4 to 6 carbon atoms in their alkyl, alkylene, and cycloalkyl radicals also represent useful agents for oral treatment of diabetes. Said compounds, on administration in the daily dosage set forth herein for n-butyl sulfanilyl urea, i.e., in a daily dose between about 0.5 g. and about 3.5 g., have a satisfactory blood sugar lowering effect and are capable of replacing at least 40 units of insulin.

Such alkyl, alkylene, and cycloalkyl substituted sulfanilyl urea compounds with 4 to 6 carbon atoms in their alkyl, alkylene, and cycloalkyl radical are produced in an analogous manner as described hereinabove for n-butyl sulfanilyl urea.

Preferred compounds of this group correspond to the formula

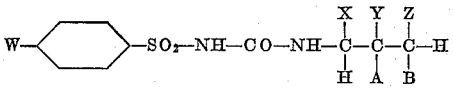

wherein

W is an amino group or an acylamido group,
X and Z are hydrogen, methyl, or ethyl, or X and Z together forming a methylene, ethylene, or propylene bridge between the carbon atoms to which they are attached,
Y is hydrogen, methyl, or ethyl,
$\Sigma(X+Y+Z)$ being less than four carbon atoms, and
A and B are hydrogen or A and B together forming with the carbon atoms to which they are attached a double bond.

The following examples serve to illustrate the preparation of such compounds without, however, being limited thereto.

EXAMPLE 16

*2-pentyl sulfanilyl urea*

(a) 153 g. of the 2-pentylamine salt of bis-(acetyl sulfanilyl) urea are heated at 100° C. for one hour and at 142° C. for 3 hours. The reaction product, after cooling, is pulverized and stirred with 700 cc. of water for 2 hours. Thereafter 50 cc. of 10 N-sodium hydroxide solution are added and stirring is continued until a clear solution is obtained. Carbon dioxide is introduced into the alkaline solution until added phenolphthalein indicator becomes colorless. Thereby acetyl sulfanilamide is precipitated, filtered off by suction and washed with water. 50 g. thereof are obtained. Melting point 174–177° C.

The acetyl product is stirred with 240 cc. of 70% methanol for one hour. The insoluble 2-pentyl acetyl sulfanilyl urea is filtered off by suction. 52 g. of a compound melting at 180–183° C. are obtained.

(b) 52 g. of 2-pentyl acetyl sulfanilyl urea are heated with 96 cc. of 5 N potassium hydroxide solution in a water bath of 92° C. for 70 minutes while stirring. A cake of crystals is formed thereby. The crystals are dissolved by the addition of 200 cc. of water and by heating the mixture. The solution is shaken with activated charcoal and is filtered. The pH-value of the filtrate is adjusted by the addition of hydrochloric acid to a pH of 5.2 at a temperature of 50° C. A crystalline precipitate of 2-pentyl sulfanilyl urea melting at 152-154° C. is obtained. The yield amounts to 41 g.

EXAMPLE 17

3-pentyl sulfanilyl urea

In place of the 2-pentylamine salt of bis-(acetyl sulfanilyl) urea used in the preceding example, there is employed the same amount of the 3-pentylamine salt of bis-(acetyl sulfanilyl) urea. The procedure is otherwise the same as described in said preceding Example 16.

The intermediate 3-pentyl acetyl sulfanilyl urea has a melting point of 195-197° C. while the final 3-pentyl sulfanilyl urea prepared therefrom melts at 156-158° C.

EXAMPLE 18

Iso-butyl sulfanilyl urea

In place of n-butylamine used in Example 1 as starting material, there is employed the same amount of iso-butylamine while otherwise the procedure is the same as that described in Example 1. Thereby isobutyl sulfanilyl urea is obtained.

EXAMPLE 19

Cyclohexyl sulfanilyl urea (a) 545 g. of the cyclohexylamine salt of bis-(acetyl sulfanilyl) urea (1.04 mols) are heated in a drying oven at 100° C. for one hour and thereafter at 143° C. for 3 hours. The hard reaction cake is mixed with 450 cc. of water. The resulting mixture is finely pulverized after standing for 16 hours at room temperature and is stirred with 1000 cc. of water and 100 cc. of 10 N sodium hydroxide solution for 3-4 hours. Insoluble matter is removed by filtration by suction. The pH-value of the filtrate is adjusted to a pH of 8.8 by stirring with hydrochloric acid. The precipitated acetyl sulfanilamide is filtered off by suction and is washed with 200 cc. of water. The filtrate is adjusted at 50° to a pH-value of 5.2 by the addition of sulfuric acid. Thereby, cyclohexyl acetyl sulfanilyl urea crystallizes. After stirring for one hour the crystals are filtered off by suction and are washed with water and ethanol. 268 g. of cyclohexyl acetyl sulfanilyl urea of the melting point 200-203° C. are obtained. The yield amounts to 75% of the theoretical yield.

(b) 268 g. of said cyclohexyl acetyl sulfanilyl urea are heated with 470 cc. of 5 N potassium hydroxide solution in a water bath of 92° C. for 2 hours while stirring. The potassium salt of cyclohexyl sulfanilyl urea which precipitates on saponification is filtered off by suction after standing for 16 hours at room temperature. The crystals are dissolved in 1100 cc. of water. The pH of said solution is adjusted to a pH of 5.2 by the addition of hydrochloric acid whereby the temperature is kept at 70° C. Cyclohexyl sulfanilyl urea crystallizes. It is filtered off by suction and washed with water. 196 g. of cyclohexyl sulfanilyl urea melting at 180-182° C. are obtained. The yield amounts to 85% of the theoretical yield.

EXAMPLE 20

Cyclopentyl sulfanilyl urea

In place of the cyclohexylamine salt of bis-(acetyl sulfanilyl) urea used in the preceding example as starting material, there are employed equimolecular amounts of the cyclopentylamine salt of bis-(acetyl sulfanilyl) urea, while otherwise the procedure is the same as described in the preceding example.

EXAMPLE 21

Crotyl sulfanilyl urea

In place of butyl isothiocyanate used hereinabove in Example 2, there is employed the equimolecular amount of crotyl isothiocyanate while otherwise the procedure is the same as described in said Example 2.

Thereby, crotyl acetyl sulfanilyl thiourea of the melting point 172-174° C. and crotyl acetyl sulfanilyl urea of the melting point 194-197° C. are obtained as intermediate products. The final crotyl sulfanilyl urea has a melting point of 123-125° C.

EXAMPLE 22

Secondary butyl sulfanilyl urea 54 g. of acetyl sulfanilyl methyl urethane and 250 cc. of dichloro benzene are intimately mixed with each other. 16.2 g. of 2-amino butane are slowly added thereto. A smeary mass is obtained thereby. Said mass is heated for 7 hours at a temperature of 105-110° C. Thereby, an oil is first formed. Said oil gradually crystallizes and forms a casein-like mass. After cooling, the crystals are filtered off by suction and washed with ether. The residue is dissolved in 130 cc. of 2 N ammonia. Said solution is extracted with ether in order to remove all of the dichloro benzene. The aqueous solution is shaken with animal charcoal. Hydrochloric acid is added to the filtrate until it is of Congo-acid reaction. The yield of the resulting secondary butyl acetyl sulfanilyl urea amounts to 54.4 g.

The acetyl compound is saponified by heating it at a temperature of 60° C. in 140 cc. of 50% ethanol and 24 g. of sodium hydroxide for 3 hours. After cooling, the solution is diluted with 150 cc. of water, clarified by the addition of animal charcoal and acidified to a pH between 3.0 and 4.0 by the addition of concentrated hydrochloric acid. The resulting secondary butyl sulfanilyl urea precipitates in a somewhat oily state. It solidifies on seeding. 40.5 g. of secondary butyl sulfanilyl urea are obtained. Its melting point is 137.0-137.5° C.

EXAMPLE 23 n-Hexyl sulfanilyl urea

The n-hexylamine salt of bis-(p-methyl carbamido benzene sulfonyl) urea is heated in a drying oven at a temperature of 140-142° C. for one hour while stirring. Thermal decomposition of said salt is completed as soon as a sample of the treated salt, on shaking with 10 times its volume of water, filtering off the insoluble reaction product, and acidifying the filtrate, no longer yields a precipitate of unreacted bis-(p-methyl carbamido benzene sulfonyl) urea. As soon as the reaction is completed, heating is discontinued. The resulting n-hexyl (p-carbamido benzene sulfonyl) urea is separated from simultaneously formed p-methyl carbamido benzene sulfonamide by shaking the reaction product with a solution of sodium bicarbonate wherein the urea derivative is soluble while the sulfonamide remains insoluble. The solution is filtered and acidified to Congo-acid reaction by the addition of hydrochloric acid. The precipitated crude n-hexyl (p-methyl carbamido benzene sulfonyl) urea is added to a concentrated solution of sodium hydroxide (2.5 mols calculated for the starting material) and heated at 70° C. until a sample of the saponification product is completely soluble in hydrochloric acid. The solution is then diluted with water and shaken with animal charcoal. The filtrate is acidified to a pH of 4.0 by the addition of hydrochloric acid. Thereby n-hexyl sulfanilyl urea is obtained.

When using equimolecular amounts of the following amines, in place of n-butyl-amine, and otherwise proceeding as described in Example 1, the following alkyl substituted sulfanilyl urea compounds are obtained:

| Amine | Sulfanilyl urea compound |
|---|---|
| tertiary butylamine | tertiary butyl sulfanilyl urea. |
| 1-pentylamine | 1-pentyl sulfanilyl urea. |
| 2-methyl-1-butylamine | 2-methyl-1-butyl sulfanilyl urea. |
| 3-methyl-1-butylamine | 3-methyl-1-butyl sulfanilyl urea. |
| 3-methyl-2-butylamine | 3-methyl-2-butyl sulfanilyl urea. |
| 2-methyl-2-butylamine | 2-methyl-2-butyl sulfanilyl urea. |
| 2,2-dimethyl-1-propylamine | 2,2-dimethyl-1-propyl sulfanilyl urea. |
| 2-hexylamine | 2-hexyl sulfanilyl urea. |
| 3-hexylamine | 3-hexyl sulfanilyl urea. |
| 2-methyl-1-pentylamine | 2-methyl-1-pentyl sulfanilyl urea. |
| 3-methyl-1-pentylamine | 3-methyl-1-pentyl sulfanilyl urea. |
| 4-methyl-1-pentylamine | 4-methyl-1-pentyl sulfanilyl urea. |
| 2-ethyl-1-butylamine | 2-ethyl-1-butyl sulfanilyl urea. |
| 2-methyl-2-pentylamine | 2-methyl-2-pentyl sulfanilyl urea. |
| 3-methyl-2-pentylamine | 3-methyl-2-pentyl sulfanilyl urea. |
| 4-methyl-2-pentylamine | 4-methyl-2-pentyl sulfanilyl urea. |
| 2-methyl-3-pentylamine | 2-methyl-3-pentyl sulfanilyl urea. |
| 3-methyl-3-pentylamine | 3-methyl-3-pentyl sulfanilyl urea. |
| 2,2-dimethyl-1-butylamine | 2,2-dimethyl-1-butyl sulfanilyl urea. |
| 2,3-dimethyl-1-butylamine | 2,3-dimethyl-1-butyl sulfanilyl urea. |
| 3,3-dimethyl-1-butylamine | 3,3-dimethyl-1-butyl sulfanilyl urea. |
| 2,3-dimethyl-2-butylamine | 2,3-dimethyl-2-butyl sulfanilyl urea. |
| 3,3-dimethyl-2-butylamine | 3,3-dimethyl-2-butyl sulfanilyl urea. |
| $\Delta_{1,2}$-cyclopentenyl-1-amine | $\Delta_{1,2}$-cyclopentenyl-1-sulfanilyl urea. |
| $\Delta_{2,3}$-cyclopentenyl-1-amine | $\Delta_{2,3}$-cyclopentenyl-1-sulfanilyl urea. |
| $\Delta_{3,4}$-cyclopentenyl-1-amine | $\Delta_{3,4}$-cyclopentenyl-1-sulfanilyl urea. |
| $\Delta_{1,2}$-cyclohexenyl-1-amine | $\Delta_{1,2}$-cyclohexenyl-1-sulfanilyl urea. |
| $\Delta_{2,3}$-cyclohexenyl-1-amine | $\Delta_{2,3}$-cyclohexenyl-1-sulfanilyl urea. |
| $\Delta_{3,4}$-cyclohexenyl-1-amine | $\Delta_{3,4}$-cyclohexenyl-1-sulfanilyl urea. |
| $\Delta_{3,4}$-butenyl-1-amine | $\Delta_{3,4}$-butenyl-1-sulfanilyl urea. |
| $\Delta_{3,4}$-butenyl-2-amine | $\Delta_{3,4}$-butenyl-2-sulfanilyl urea. |

These compounds, of course, can also be produced according to the methods disclosed hereinbefore, for instance, by reacting equimolecular amounts of the corresponding alkyl, alkylene, or cycloalkyl isothiocyanates with the sodium salt of acetyl sulfanilamide as described in Example 2, i.e., via the corresponding thiourea compounds, or by reacting the sodium salt of p-nitro benzene sulfonamide with the corresponding alkyl, alkylene, or cycloalkyl isocyanates as described in Example 3, or in any other suitable manner as disclosed hereinabove.

It may be mentioned that the isoamyl sulfanilyl urea exerts a rather abrupt and unreliable therapeutic action and that its acetyl derivative has a relatively low solubility. For that reason the isoamyl compound would probably not be found advantageous by the general practitioner.

The blood sugar lowering compounds of this group of substituted sulfanilyl urea compounds according to the present invention form alkali metal, alkaline earth metal and ammonia salts, and especially potassium, sodium and calcium salts, and salts with various organic amines which are compatible with the human system. Some of said salts are of importance because of their high water-solubility. For instance, the sodium and magnesium salts are readily soluble in water so that injectable aqueous solutions can be prepared. Such solutions can be used in cases where intravenous administration is desired. The dosage is about the same as on oral administration.

Said salts are prepared, for instance, according to the following examples without, however, being limited thereto.

EXAMPLE 24

*Potassium salt of n-butyl sulfanilyl urea*

On saponification of n-butyl acetyl sulfanilyl urea with potassium hydroxide solution as described in Example 1 under (c), a paste of crystals is obtained. Said paste is centrifuged and washed with 50% ethanol. On re-crystallization from hot water, the potassium salt of n-butyl sulfanilyl urea is obtained in a sufficiently pure state so that it can be used for therapeutic purposes. Said salt yields aqueous solutions of practically neutral reaction, i.e., of a pH between 7.5 and 7.9.

EXAMPLE 25

*Potassium salt of n-butyl sulfanilyl urea*

1 mol of n-butyl sulfanilyl urea is suspended in 4 times its volume of 80% ethanol at a temperature of 50° C. 1.1 mols of aqueous 50% potassium hydroxide solution are added at once to said suspension while stirring. The crystals are first dissolved but soon crystallization sets in. After cooling, the crystals are filtered off by suction and washed with 80% ethanol.

EXAMPLE 26

*Potassium salt of n-butyl sulfanilyl urea*

One mol of n-butyl sulfanilyl urea is dissolved in the equimolecular amount of aqueous sodium hydroxide solution of a concentration sufficient to yield a 20% solution of said urea compound. The solution is heated to 80° C. and is filtered. A filtered solution of 1 mol (twice the equimolecular amount) of potassium carbonate is added to said filtrate at a temperature of 80° C. The potassium salt soon starts to crystallize. After cooling, the crystals are filtered off by suction, washed with 20% ethanol and then with 80% ethanol, and dried.

EXAMPLE 27

*Sodium salt of n-butyl sulfanilyl urea* n-Butyl sulfanilyl urea is dissolved at a temperature of about 40° C. in the equimolecular amount of a 15% sodium hydroxide solution. The solution is exactly neutralized either by the addition of small amounts of n-butyl sulfanilyl urea or of sodium hydroxide solution so that the pH-value of the resulting solution is adjusted to a pH of 7.5. The filtered solution is allowed to stand for some time in a refrigerator and yields the crystalline sodium salt of n-butyl sulfanilyl urea which is separated by suction. Said salt yields also practically neutral aqueous solutions, i.e., solutions of a pH between 7.5 and 7.9.

EXAMPLE 28

*Magnesium salt of n-butyl sulfanilyl urea*

One mol of n-butyl sulfanilyl urea and the equimolecular amount of freshly precipitated magnesium hydroxide are dissolved at a temperature of 60° C. in such an amount of water as to give a 20% solution. The solution is then heated to about 50° C. and filtered at said temperature. The filtrate is evaporated to dryness in a vacuum at about 40° C. The residue is the magnesium salt of n-butyl sulfanilyl urea, which is readily soluble in water.

EXAMPLE 29

*Ammonium salt of n-butyl sulfanilyl urea*

One mol of n-butyl sulfanilyl urea is dissolved at a temperature of 60° C. in 200 cc. of 10 N ammonia. After filtration the solution is allowed to stand for some time at normal temperature. The crystalline ammonium salt precipitates. It is filtered off by suction, washed with a little 10 N aqueous ammonia and then with 96% ethanol and dried. White crystals, which are sparingly soluble in water, are obtained.

EXAMPLE 30

*Calcium salt of n-butyl sulfanilyl urea*

One mol of n-butyl sulfanilyl urea is dissolved in the equimolecular amount of triethanolamine and sufficient water to yield a 50% solution. Said solution is filtered at a temperature of about 60° C. The filtrate is poured into a solution of 100 g. of calcium chlorid in 100 cc. of water at a temperature of 60° C. On cooling and standing for some hours, the calcium salt crystallizes and is separated from the mother liquor by suction.

EXAMPLE 31

Mono-ethanolamine salt of n-butyl sulfanilyl urea

One mol of pure n-butyl sulfanilyl urea is suspended in four times its volume of water. Exactly the equimolecular amount of mono-ethanolamine is added thereto. The suspension is heated to about 50° C. until complete solution is achieved. Water is added to said solution in an amount sufficient to yield a volume of 5 cc. for each g. of n-butyl sulfanilyl urea employed as starting material. Thereby, a solution containing 20% of the mono-ethanolamine salt of n-butyl sulfanilyl urea, calculated for free n-butyl sulfanilyl urea, is obtained. On evaporation of the aqueous solution in a vacuum at about 40° C., a residue is obtained which represents the mono-ethanolamine salt of n-butyl sulfanilyl urea.

When using, in place of mono-ethanolamine employed in the preceding Example 31, an equimolecular amount of other lower alkanolamines such as di-ethanolamine, tri-ethanolamine, or lower alkylamines such as methylamine, dimethylamine, ethylamine, di-ethylamine, ethylene diamine, and others, the corresponding alkanolamine and alkylamine salts of n-butyl sulfanilyl urea are obtained. Such salts with lower alkanolamines and lower alkylamines are the preferred salts with organic bases. It is, however, possible to produce salts with other organic bases which are compatible to the human system in the amounts administered, by proceeding in the same manner as described hereinabove in Example 31 and using such other organic bases as reaction components.

The alkali metal, alkaline earth metal, ammonia salts and the salts with organic amines of other sulfanilyl urea compounds as they are disclosed hereinabove can likewise be prepared by following the procedure described in Examples 24 to 31 and using, in place of n-butyl sulfanilyl urea, equimolecular amounts of such other alkyl, alkylene, and cycloalkyl substituted sulfanilyl urea compounds.

The salts set forth herein are useful in the treatment of diabetes in like manner as the compounds set forth herein, administered in the same dosage and in the same time sequence as said compounds.

In addition to their surprising blood sugar lowering action the compounds of the present invention also possess antibacterial activity. They are, however, not particularly well suited for such purpose unless their administration is accompanied by the administration of compounds which are capable of reducing the danger of hypoglycemic symptoms in non-diabetics. Such an agent is, for instance, glucose administered in amounts of at least 10 g. per g. of sulfanilyl urea compound.

The present application is a continuation-in-part of the copending application Serial No. 408,031, filed on January 29, 1954, and entitled N-Sulfanilyl Ureas and Process of Manufacturing Same.

We claim:

1. An anti-diabetic composition suitable for oral administration, said composition comprising a pharmaceutical carrier and, as antidiabetic agent, not less than 5% of $N_1$-sulfanilyl-$N_2$-(n-butyl) urea.

2. An antidiabetic composition suitable for oral administration, said composition comprising a solid pharmaceutical carrier and, as antidiabetic agent, not less than 5% of $N_1$-sulfanilyl-$N_2$-(n-butyl) urea.

3. An antidiabetic composition in tablet dosage unit form suitable for oral administration, said composition comprising a solid pharmaceutical carrier and, as antidiabetic agent, between about 50 mg. and about 500 mg., per dosage unit, of $N_1$-sulfanilyl-$N_2$-(n-butyl) urea.

4. An antidiabetic composition suitable for oral administration, said composition comprising a pharmaceutical carrier and, as antidiabetic agent, not less than 5% of an $N_1$-sulfanilyl-$N_2$-substituted urea compound selected from the group consisting of $N_1$-sulfanilyl-$N_2$-alkyl urea compounds of the formula

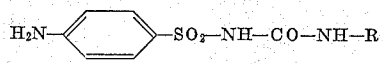

wherein R indicates an alkyl radical having 4–6 carbon atoms, and their substantially non-toxic salts with alkali metals, alkaline earth metals, ammonia, lower alkanol amines, and ethylene diamine.

5. An antidiabetic composition suitable for oral administration, said composition comprising a solid pharmaceutical carrier and, as antidiabetic agent, not less than 5% of an $N_1$-sulfanilyl-$N_2$-substituted urea compound selected from the group consisting of $N_1$-sulfanilyl-$N_2$-alkyl urea compounds of the formula

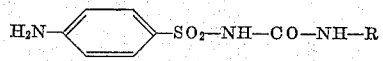

wherein R indicates an alkyl radical having 4–6 carbon atoms, and their substantially non-toxic salts with alkali metals, alkaline earth metals, ammonia, lower alkanol amines, and ethylene diamine.

6. An antidiabetic composition in tablet dosage unit form suitable for oral administration, said composition comprising a solid pharmaceutical carrier and, as antidiabetic agent, between about 50 mg. and about 500 mg., per dosage unit, of an $N_1$-sulfanilyl-$N_2$-substituted urea compound selected from the group consisting of $N_1$-sulfanilyl-$N_2$-alkyl urea compounds of the formula

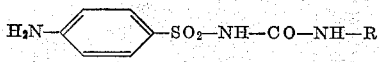

wherein R indicates an alkyl radical having 4–6 carbon atoms, and their substantially non-toxic salts with alkali metals, alkaline earth metals, ammonia, lower alkanol amines, and ethylene diamine.

7. The method of orally treating diabetes, which method comprises orally administering $N_1$-sulfanilyl-$N_2$-(n-butyl)-urea in a daily dose between about 0.5 g. and about 4.0 g. to a diabetic patient.

8. The method of orally treating diabetes, which method comprises orally administering to a diabetic patient $N_1$-sulfanilyl-$N_2$-(n-butyl)-urea in an initial dose between about 2.0 g. and 4.0 g. followed, on subsequent days, by a daily dose of about 0.5 g. to about 2.0 g.

9. The method of orally treating diabetes, which method comprises orally administering to a diabetic patient a sulfanilyl urea compound selected from the group consisting of $N_1$-sulfanilyl-$N_2$-alkyl urea compounds of the formula

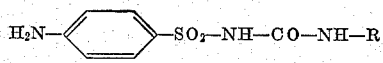

wherein R indicates an alkyl radical having 4 to 6 carbon atoms, their salts with alkali metals, alkaline earth metals, ammonia, lower alkanol amines, and ethylene diamine in a daily dose between about 0.5 g. and about 4.0 g.

References Cited in the file of this patent

UNITED STATES PATENTS

| | | |
|---|---|---|
| 846,895 | Bauer | Mar. 12, 1907 |
| 2,082,952 | Gruwell et al. | June 8, 1937 |
| 2,312,404 | Haack | Mar. 2, 1943 |
| 2,371,178 | Martin et al. | Mar. 13, 1945 |
| 2,385,571 | Haack | Sept. 25, 1945 |

FOREIGN PATENTS

| | | |
|---|---|---|
| 993,465 | France | July 25, 1951 |
| 919,464 | France | Nov. 25, 1946 |
| 71,236 | Norway | Nov. 4, 1946 |
| 236,178 | Switzerland | June 1, 1945 |

OTHER REFERENCES

Loubatieres: Arch. intern. physiol., vol 54, 1946, pp. 174–177 (cited in Chem. Abstr., vol. 41, 1947, p. 812b).

Chem. Abstr., vol. 42, 1948, p. 6006.